United States Patent [19]

Hornstra

[11] 3,900,290

[45] Aug. 19, 1975

[54] METHOD AND APPARATUS FOR DETERMINING THE DEGREE OF PLATELET AGGREGATION IN BLOOD

[75] Inventor: Gerard Hornstra, Klaaswaal, Netherlands

[73] Assignee: N.V. Internationale Octrooi Maatschappij "Octropa", Rotterdam, Netherlands

[22] Filed: Mar. 12, 1974

[21] Appl. No.: 450,529

[30] Foreign Application Priority Data

Mar. 13, 1973 Netherlands ...................... 7303522

[52] U.S. Cl. ............. 23/230 B; 23/253 R; 73/61 R; 73/64.1; 128/2; 210/90
[51] Int. Cl.² .................. G01N 15/00; G01N 33/16
[58] Field of Search ......... 23/230 B, 253 R; 210/90; 73/61 R, 64.1

[56] References Cited
UNITED STATES PATENTS

| | | | |
|---|---|---|---|
| 3,366,240 | 1/1968 | Gruber | 210/90 |
| 3,412,706 | 11/1968 | Topol | 210/90 X |
| 3,429,291 | 2/1969 | Hoffman | 210/90 X |
| 3,492,096 | 1/1970 | Hattersley | 23/230 B |
| 3,503,709 | 3/1970 | Yochem | 23/230 B |
| 3,635,678 | 1/1972 | Seitz | 23/230 BX |
| 3,686,925 | 8/1972 | Fleisch | 73/61 R |
| 3,694,161 | 9/1972 | Kleszynski | 23/230 B |

FOREIGN PATENTS OR APPLICATIONS 1,263,894   2/1972   United Kingdom

Primary Examiner—Morris O. Wolk
Assistant Examiner—Sidney Marantz
Attorney, Agent, or Firm—Kaufman & Kramer

[57] ABSTRACT

The apparatus consists of a filter which allows blood cells to pass but precludes passage of aggregated platelets. A sample supply of blood is fed via the filter to a suction pump by tubing, and the pressure drop is measured across the filter.

7 Claims, 1 Drawing Figure

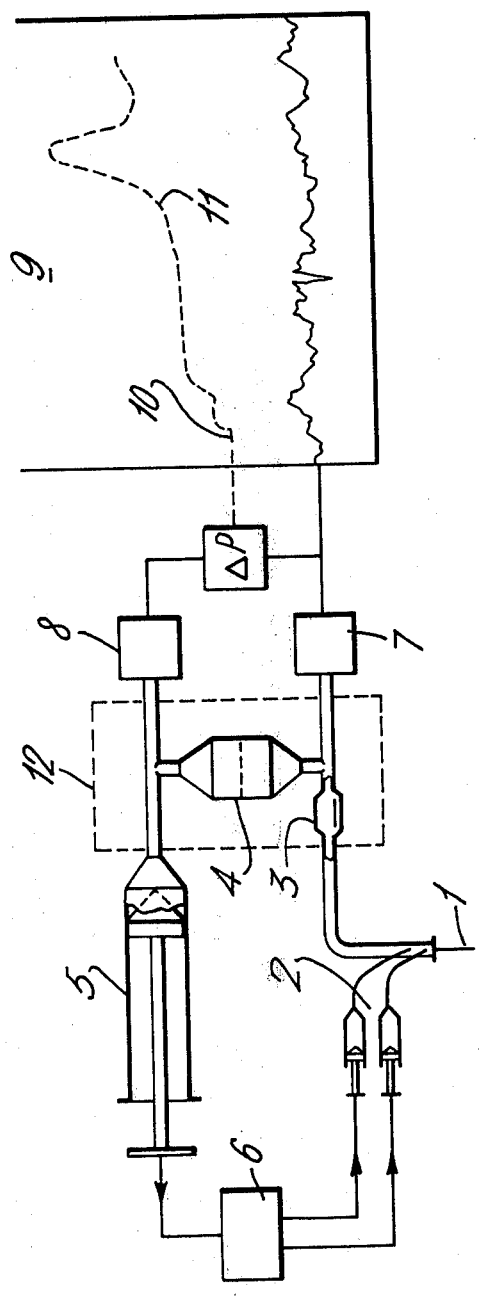

METHOD AND APPARATUS FOR DETERMINING THE DEGREE OF PLATELET AGGREGATION IN BLOOD

The invention relates to an apparatus for determining the degree of spontaneous and experimentally induced platelet aggregation.

The principle according to which this apparatus works is based on that of a technique developed by us earlier, in which the aggregation of platelets induced by adenosine diphosphate (ADP) in rats is determined by catching the aggregates in an artificially mounted loop in the arterial circulation with the aid of a filter, as published in British Journal of Haematology, Vo. 19, No. 3, September 1970, pages 321–329. This appeared to be a valuable method for assessing the effects of drugs, but also of various types of dietary fats eaten, on the aggregating tendency of platelets.

However, use of this technique on animals other than rats and on man appeared to be less suitable as a result of fairly severe catheterization of an artery.

In order to avoid this the present apparatus (FILTRAGOMETER) was developed, in which venous blood is drawn through the filter either directly from a vein or indirectly from a conditioned supply.

According to the invention the apparatus for determining the degree of platelet aggregation in blood comprises connected in series by tubing, sample supply means for supply of a sample of blood to be examined, a filter having a pore size which allows red and white blood cells to pass but prevents passage of aggregated platelets, a pump for drawing blood from said supply and through the filter, and pressure measuring means for measuring the pressure drop across the filter.

In using this apparatus, a sample of blood is drawn through the filter at a known rate and the time taken for a pressure change to indicate filter blockage is then a direct measure of the degree of platelet aggregation in in that sample.

Preferably the apparatus comprises at least one additive substance supply means arranged for addition of additive substance to the blood sample prior to passage through the filter, and mixing means for mixing the additive substance with the blood sample. This enables the degree of experimentally induced aggregation to be measured, or for the sample to be stabilised or have its degree of platelet aggregation increased or decreased a known amount prior to the measurement.

Preferably the pump is mounted downstream of the filter and is arranged to operate at constant speed. This ensures that reproducible results are more reliably obtained.

It is advantageous for the mixing means and the filter to be arranged as an integral replaceable unit. This enables sterile working to be achieved effeciently.

It has appeared that the filtragometer can be used on man (see "The Lancet", 26 May, 1973, pp. 1155–1157) and on most of the usual laboratory animals (including rats, rabbits).

The apparatus and its mode of operation will now be further explained with reference to the schematic drawing.

The blood to be examined can either be extracted directly from a vein with the aid of a needle 1, or be drawn from a conditioned supply. At 2 there is the possibility of adding a substance stabilising and/or promoting aggregation, or an anti-coagulant. In a mixing chamber 3 the mixture thus obtained is thoroughly mixed. For this purpose a magnetic mixing system is very suitable. The mixture is then drawn through a filter 4, this being effected by means of a pump indicated as 5. The pore size in the filter should be such as to prevent aggregated platelets from passing but to allow passage of the normal red and white blood cells. The pump is driven at a constant rate by a motor 6, which can also be used to dose the substances at 2. The mixing chamber 3 and the filter 4, together with the attached tubing, are kept at a temperature of 37°C with the aid of a heating system 12. The pressure in the mixture before and behind the filter is measured by means of two pressure transducers 7 and 8. The values obtained are subtracted from each other electronically ($\Delta$ P) and the result recorded on a recording apparatus 9, on which the pressure recorded by transducer 7 before the filter is noted as reference.

On the diagram of the recording apparatus in the drawing, and only as an example, a measurement is shown which in this case proceeded as follows: just before starting the measurement, sodium citrate solution was introduced at 2 in order to prevent the inclusion of air bubbles during the connection of the system to the vein punctured with a needle. Immediately after the connection of the system with the blood to be examined the suction pump 5 was started, the citrate infusion stopped and an infusion with heparin started. This moment is automatically marked (10) on the pressure difference curve. At the moment the pressure difference reached the value of 5 mm mercury the heparin infusion was stopped and the citrate infusion switched on. This moment is also noted on the curve (11). After sufficient information had been obtained, the suction pump was stopped, after which the needle was removed from the vein. From the course of these and similar curves parameters can be calculated with regard to aggregation and de-aggregation.

In a specific example of use of the described type of apparatus, the aggregation of platelets in flowing blood was assessed by drawing blood via an indwelling polyethylene cannula from an antecubital vein through a microfilter of 20 um. pore size into a motor-driven syringe, at a constant rate of 2.25 ml per minute. This filtration method is based on the use of a pore size which permits passage of red and white blood-cells and platelets but is occluded by platelet aggregates. The system was maintained at 37°C in a heating block. Heparin was infused into the system proximal to the filter at an anticoagulant concentration of 5 units per ml blood. The system proximal to and including the filter was siliconised. Pressure was monitored proximal and distal to the filter, the rise in pressure difference reflecting occlusion of the filter by aggregated platelets. Macroscopic inspection and scanning electron microscopy of the filter confirmed the presence of aggregated platelets and the absence of blood clot. The procedure has been found to be reproducible. The pressure gradient across the filter was recorded for periods of up to ten minutes. The aggregation-time (number or seconds taken to reach a gradient of 5 mm Hg) was noted as was the tangent of the tracing at this point in time.

What is claimed is:

1. An apparatus for determining the degree of platelet aggregation in blood comprising, connected in series by tubing, sample supply means for supply of a sample of blood to be examined, a filter having a pore size which allows red and white blood cells to pass but prevents passage of aggregated platelets, a pump for drawing blood from said supply and through the filter, and pressure measuring means for measuring the pressure drop across the filter.

2. An apparatus according to claim 1 comprising one additive substance supply means arranged for addition of additive substance to the blood sample prior to passage through the filter, and mixing means for mixing the additive substance with the blood sample.

3. An apparatus according to claim 1 in which the pump is mounted downstream of the filter and is arranged to operate at constant speed.

4. An apparatus according to claim 2 in which the mixing means and the filter are arranged as on integral replaceable unit.

5. An apparatus according to claim 1 in which the pump is mounted downstream of the filter.

6. A method for determining the degree of platelet aggregation in blood comprising the steps of:

providing a sample supply of blood to be examined, passing the sample of blood through a filter which allows red and white blood cells to pass but prevents passage of aggregated platelets, and measuring the pressure drop across said filter to indicate the degree of platelet aggregation in said blood sample.

7. The method in accordance with claim 6 wherein the sample of blood is drawn through said filter.

* * * * *